(12) United States Patent
Kawashima (10) Patent No.: US 12,182,643 B2
(45) Date of Patent: Dec. 31, 2024

(54) IMAGE FORMING APPARATUS

(71) Applicant: KYOCERA Document Solutions Inc., Osaka (JP)

(72) Inventor: Naoko Kawashima, Osaka (JP)

(73) Assignee: Kyocera Document Solutions, Inc. (JP)

( * ) Notice: Subject to any disclaimer, the term of this patent is extended or adjusted under 35 U.S.C. 154(b) by 155 days.

(21) Appl. No.: 17/969,387

(22) Filed: Oct. 19, 2022

(65) Prior Publication Data

US 2023/0126430 A1    Apr. 27, 2023

(30) Foreign Application Priority Data

Oct. 26, 2021  (JP) ................. 2021-174361

(51) Int. Cl.
  *G06K 15/02* (2006.01)
  *B41J 2/045* (2006.01)
  *G06K 15/10* (2006.01)
  *B41J 2/21* (2006.01)

(52) U.S. Cl.
  CPC ........ *G06K 15/027* (2013.01); *B41J 2/04505* (2013.01); *G06K 15/102* (2013.01); *B41J 2/2139* (2013.01); *B41J 2203/01* (2020.08)

(58) Field of Classification Search
  CPC .. B41J 2/04505; B41J 2/2139; B41J 2203/01; G06K 15/027; G06K 15/102
  See application file for complete search history.

(56) References Cited

U.S. PATENT DOCUMENTS

| | | | |
|---|---|---|---|
| 9,010,897 B2 * | 4/2015 | Tanase | B41J 2/2132 347/14 |
| 11,198,291 B2 * | 12/2021 | Tsuneoka | B41J 2/14201 |
| 2006/0092211 A1 | 5/2006 | Arakawa et al. | |

FOREIGN PATENT DOCUMENTS

JP   2006-142807   6/2006

* cited by examiner

*Primary Examiner* — Sharon Polk (57) ABSTRACT

In an image forming apparatus, a correction processing unit prints a test pattern using a recording head, determines ink ejection malfunction positions on the basis of a scanned image of the test pattern, sets one of first and second correction modes for each of the ink ejection malfunction positions in accordance with a density of the ink ejection malfunction position on the basis of the scanned image, and performs the correction process for the ink ejection malfunction position in the set first or second correction mode. In the first correction mode, the correction process is performed for both a nozzle corresponding to the ink ejection malfunction position and an adjacent nozzle of the nozzle. In the second correction mode, the correction process is not performed for the nozzle corresponding to the ink ejection malfunction position but is performed for the adjacent nozzle.

6 Claims, 6 Drawing Sheets

IMAGE FORMING APPARATUS

CROSS-REFERENCE TO RELATED APPLICATIONS

This application relates to and claims priority rights from Japanese Patent Application No. 2021-174361, filed on Oct. 26, 2021, the entire disclosures of which are hereby incorporated by reference herein.

BACKGROUND

1. Field of the Present Disclosure

The present disclosure relates to an image forming apparatus.

2. Description of the Related Art

An inkjet-type image forming apparatus detects a malfunction nozzle that becomes unable to properly eject ink, among nozzles that eject ink in a recording head, and changes an ink ejection amount for an adjacent dot on the basis of an occurrence status of the malfunction nozzle.

When printing on a cut sheet, a nozzle used to depict each pixel in an image to be printed is differently determined sheet by sheet on the basis of a sheet transportation condition and correspondingly to a position (i.e. a position in a direction perpendicular to a transportation direction) of an incoming sheet in transportation. As mentioned, if the ink ejection amount is corrected due to the malfunction nozzle, then in a short time from determination of the sheet position to ink ejection, it is required to determine a pixel corresponding to the malfunction nozzle in the image to be printed and to perform a correction process for a periphery of the determined pixel.

Therefore, if many ink ejection malfunction positions appear to be corrected, the aforementioned correction process can not be completed in the short time. Although such many ink ejection malfunction positions can be corrected by performing the correction process using high-speed hardware, such high-speed hardware results in a high cost of the apparatus.

SUMMARY

An image forming apparatus according to an aspect of the present disclosure includes a recording head, a control unit, and a correction processing unit. The recording head is configured to eject ink corresponding to an image to be printed, using arranged nozzles. The control unit is configured to determine nozzles corresponding to the image to be printed, correspondingly to a position of a print sheet, and cause the recording head to eject ink from the nozzles. The correction processing unit is configured to perform a correction process corresponding to each of plural ink ejection malfunction positions in the image. Further, the correction processing unit (a) prints a test pattern using the recording head, (b) determines the ink ejection malfunction positions on the basis of a scanned image of the test pattern, (c) sets one of first and second correction modes for each of the ink ejection malfunction positions in accordance with a density of the ink ejection malfunction position on the basis of the scanned image of the test pattern, and (d) performs the correction process for the ink ejection malfunction position in the set first or second correction mode. Here, in the first correction mode, the correction process is performed for a nozzle corresponding to the ink ejection malfunction position and an adjacent nozzle of the nozzle corresponding to the ink ejection malfunction position; and in the second correction mode, the correction process is not performed for a nozzle corresponding to the ink ejection malfunction position but the correction process is performed for an adjacent nozzle of the nozzle corresponding to the ink ejection malfunction position.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
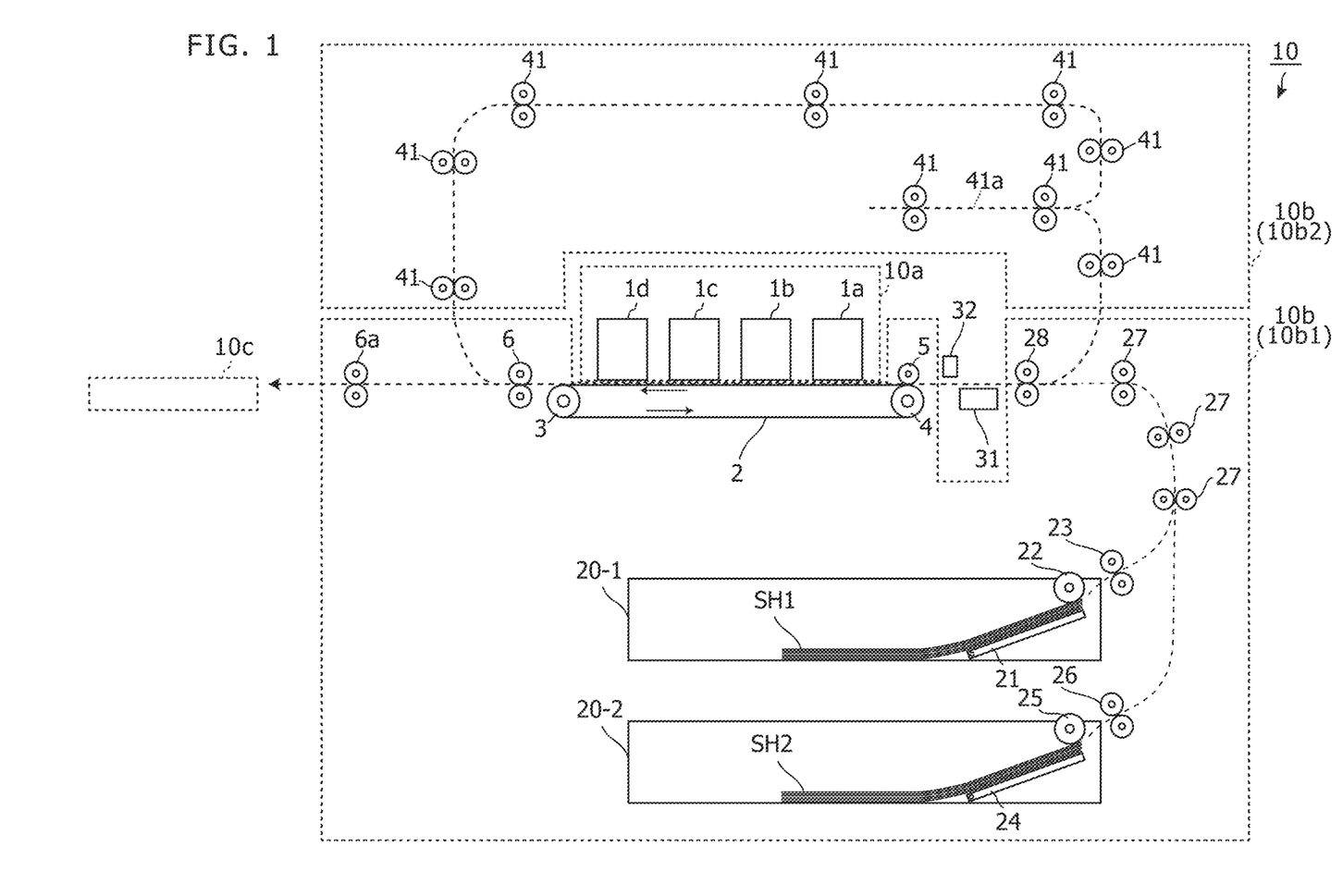
FIG. 1 shows a side view that indicates an internal mechanical configuration of an image forming apparatus in an embodiment according to the present disclosure.

FIG. 1 shows a side view that indicates an internal mechanical configuration of an image forming apparatus in an embodiment according to the present disclosure. The image forming apparatus 10 in this embodiment is an apparatus such as printer, copier, facsimile machine or multi function peripheral.

The image forming apparatus 10 shown in FIG. 1 includes a print engine 10a and a sheet transportation unit 10b. The print engine 10a physically forms an image to be printed on a print sheet (print paper sheet or the like). In this embodiment, the print engine 10a is a line-type inkjet print engine.

In this embodiment, the print engine 10a includes line-type head units 1a to 1d corresponding to four ink colors: Cyan, Magenta, Yellow, and Black.

Figure 2:
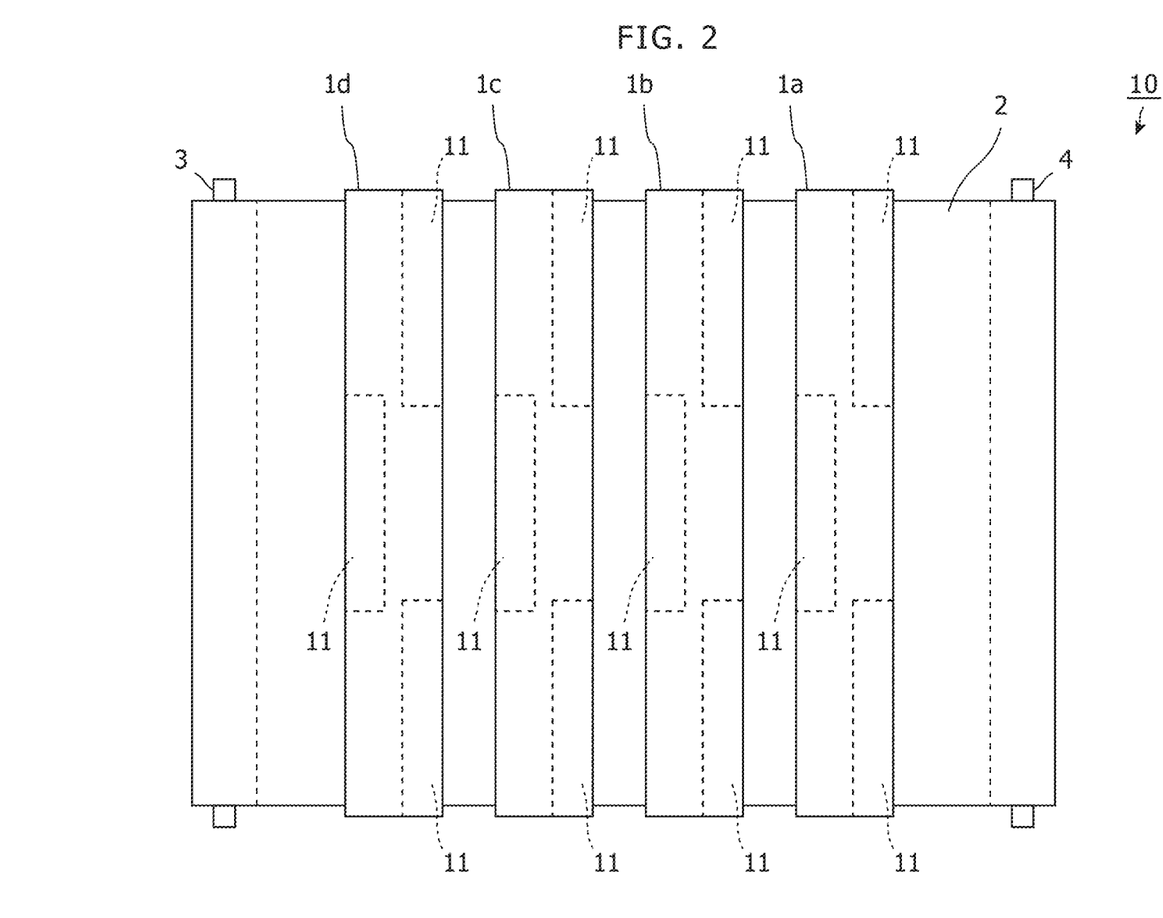
FIG. 2 shows a plane view of an example of recording heads 1a to 1d in the image forming apparatus 10 shown in FIG. 1.

FIG. 2 shows a plane view of an example of recording heads 1a to 1d in the image forming apparatus 10 shown in FIG. 1. As shown in FIG. 2, for example, in this embodiment, each of the inkjet recording units 1a, 1b, 1c and 1d includes plural (here, three) head units 11. The head units 11 are arranged along a primary scanning direction, and are capable of being mounted to and demounted from a main body of the image forming apparatus. Each of the inkjet recording units 1a, 1b, 1c and 1d may include only one head unit 11. The head unit 11 of the inkjet recording unit 1a, 1b, 1c or 1d includes 2-dimensionally arranged nozzles, and ejects ink corresponding to the image to be printed using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 and a circulation sheet transportation unit 10*b*2. In duplex printing, the main sheet transportation unit 10*b*1 transports to the print engine 10*a* a print sheet to be used for printing of a first-surface page image, and the circulation sheet transportation unit 10*b*2 transports the print sheet from a posterior stage of the print engine 10*a* to a prior stage of the print engine 10*a* with detaining a predetermined number of print sheets.

In this embodiment, the main sheet transportation unit 10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a*.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c* or the like.

Further, the main sheet transportation unit 10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a* among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine 10*a*.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine 10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31 with changing an orientation of the print sheet in a switch back manner.

Figure 3:
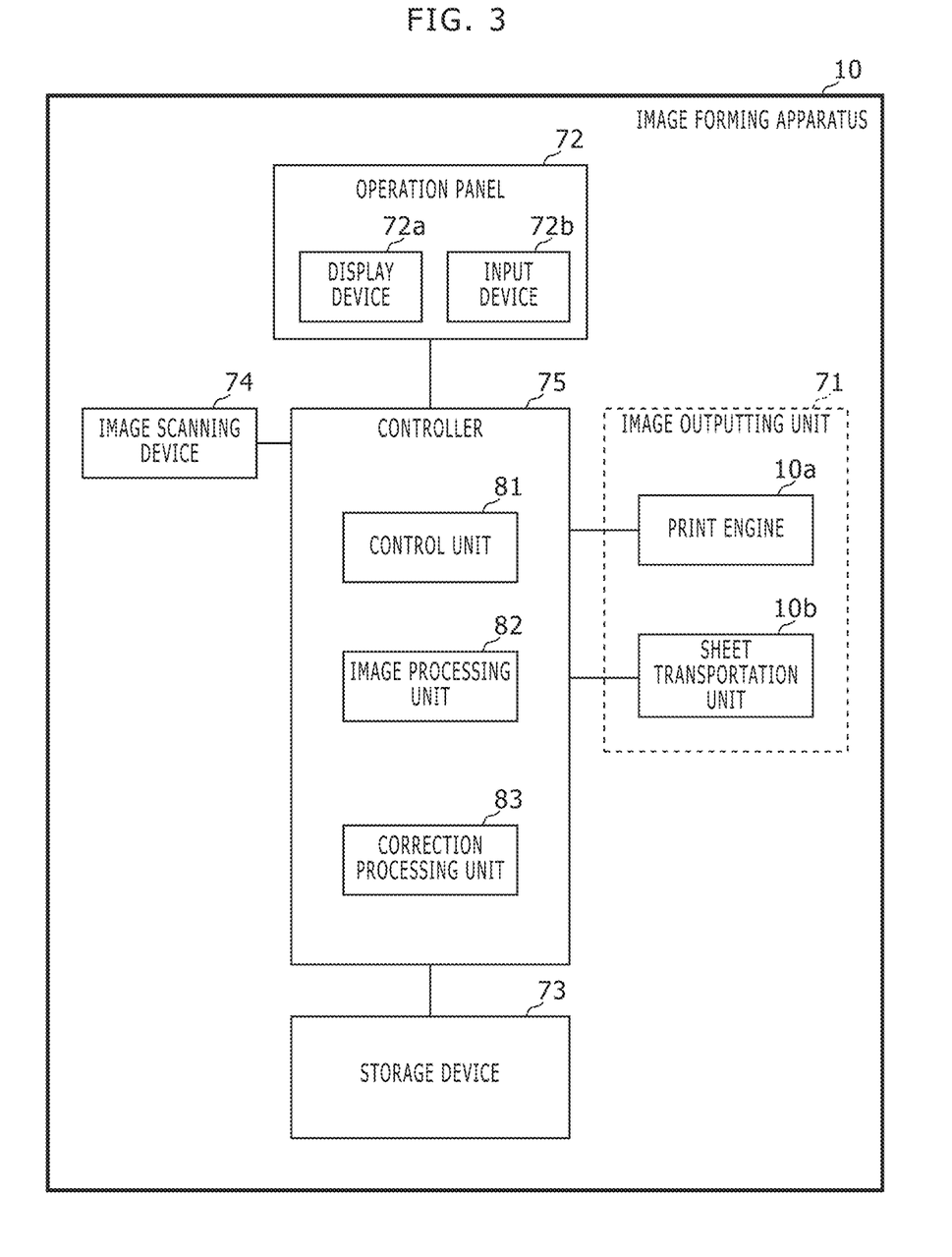
FIG. 3 shows a block diagram that indicates an electronic configuration of the image forming apparatus 10 in the embodiment according to the present disclosure.

FIG. 3 shows a block diagram that indicates an electronic configuration of the image forming apparatus 10 in the embodiment according to the present disclosure. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72*a* such as a liquid crystal display and an input device 72*b* such as a hard key and/or touch panel, and displays sorts of messages for a user using the display device 72*a* and receives a user operation using the input device 72*b*.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, and a correction processing unit 83.

The control unit 81 controls the image outputting unit 71 (the print engine 10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10a to print a user document image based on printing image data specified by a user.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10a and the actual sheet center position. In this embodiment, because the nozzles of the recording heads 1a to 1d do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1a to 1d to eject ink from the determined nozzles.

The correction processing unit 83 performs as a hardware process the correction process corresponding to each of the plural ink ejection malfunction positions in the image to be printed. In this correction process, for example, image data (a pixel value) of a pixel adjacent to the ink ejection malfunction position is corrected such that a density of this adjacent pixel gets higher.

Specifically, the correction processing unit 83 (a) prints a test pattern using the aforementioned recording heads 1a to 1d, (b) determines the ink ejection malfunction positions on the basis of a scanned image of the test pattern, (c) sets one of first and second correction modes for each of the ink ejection malfunction positions in accordance with a density of the ink ejection malfunction position on the basis of the scanned image of the test pattern, and (d) performs the correction process for each of the ink ejection malfunction positions in the set first or second correction mode.

Here, in the first correction mode, the correction process is performed for both a nozzle corresponding to the ink ejection malfunction position and an adjacent nozzle of the nozzle corresponding to the ink ejection malfunction position.

In the second correction mode, the correction process is not performed for a nozzle corresponding to the ink ejection malfunction position but the correction process is performed for an adjacent nozzle of the nozzle corresponding to the ink ejection malfunction position. In the second correction mode, an ink ejection operation is prohibited of a nozzle corresponding to the ink ejection malfunction position, and the correction process is also prohibited. Therefore, in the second correction mode, a smaller number of nozzles is set as targets of the correction process than that in the first correction mode.

In this embodiment, the correction processing unit 83 (a) using the recording heads 1a to 1d, prints a band-shaped first test pattern (hereinafter, also called "horizontal band test pattern") that extends along a primary scanning direction and a second test pattern that includes thin lines (straight thin lines along a secondary scanning direction) individually corresponding to the nozzles of the recording heads 1a to 1d, (b) selects one of the first and second correction modes in accordance with a density of the ink ejection malfunction position in the scanned image of the first test pattern, (c) if the second correction mode is selected on the basis of the scanned image of the first test pattern, selects one of the first and second correction modes in accordance with whether the second test pattern exists at the ink ejection malfunction position or not, and (d) sets the selected first or second correction mode.

For the ink ejection malfunction position on the basis of the scanned image of the test pattern, the correction processing unit 83 (a) determines an ink ejection malfunction type as one of "severe deviation or non-ejection" and "slight deviation", and (b) if the ink ejection malfunction type is determined as slight deviation, sets the first correction mode, and if the ink ejection malfunction type is determined as severe deviation or non-ejection, sets the second correction mode.

An ink ejection malfunction type of an ink ejection malfunction position includes "non ejection" and "ink ejection deviation"; and "ink ejection deviation" is a state that deviation in a primary scanning direction occurs on a hit position of an ink droplet ejected from a nozzle, and is classified into "severe deviation" or "slight deviation" correspondingly to an amount of the deviation.

Figure 4:
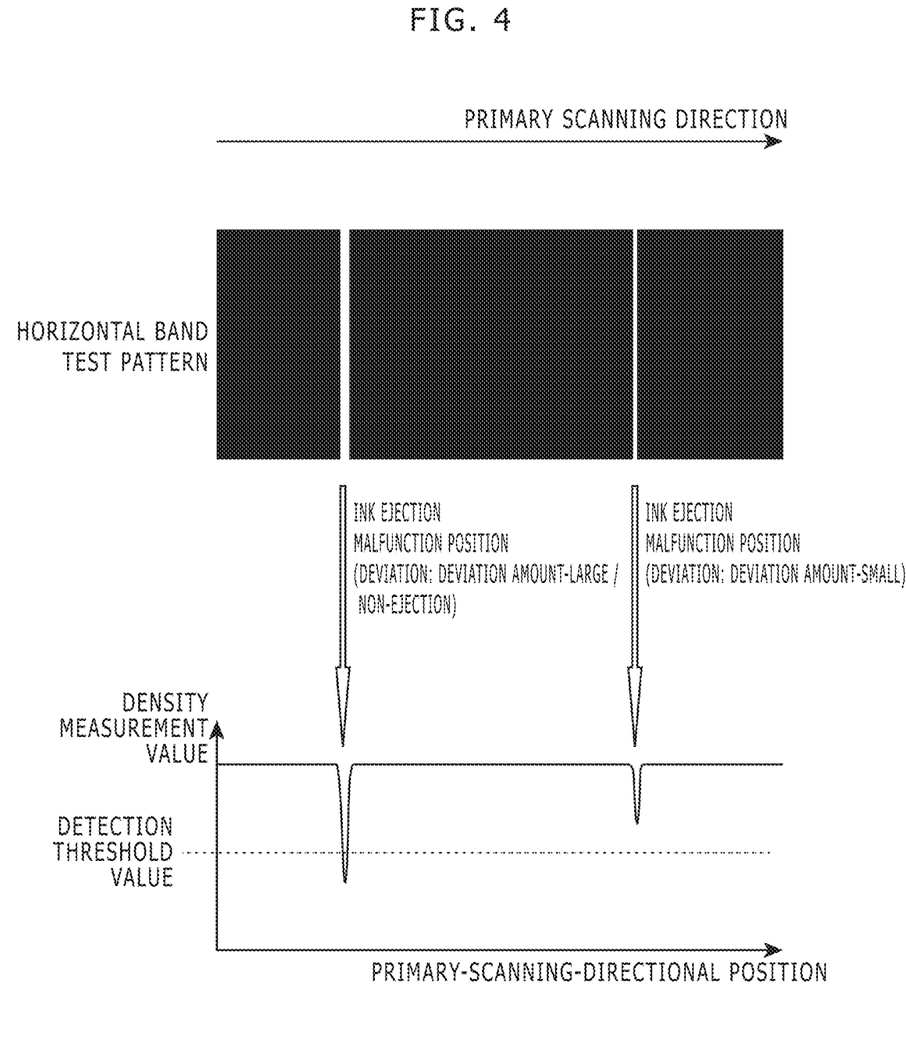
FIG. 4 shows a diagram that explains detection of an ink ejection malfunction position on the basis of a density distribution of a scanned image of a horizontal band test pattern.
Figure 5:
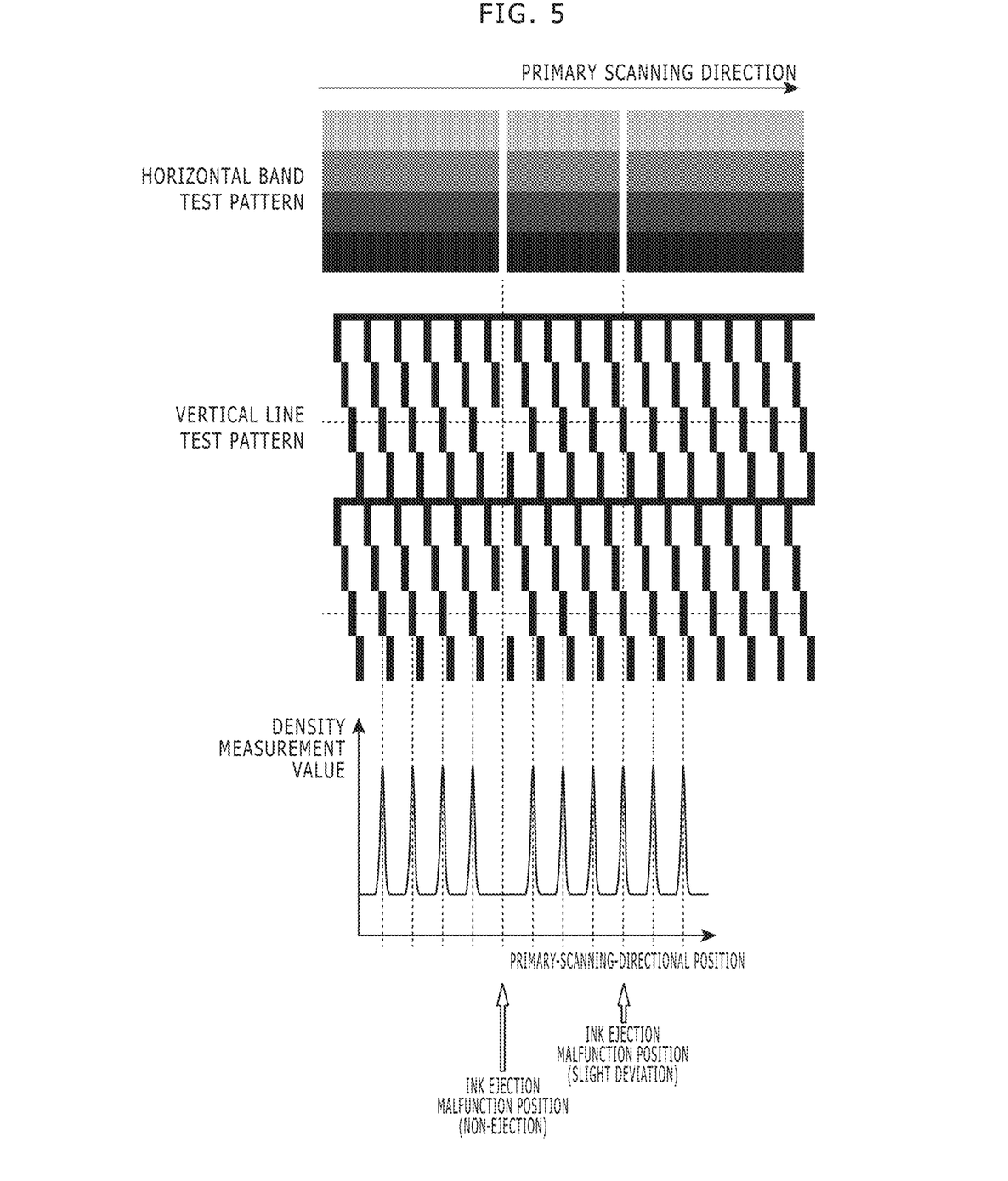
FIG. 5 shows a diagram that explains determination of an ink ejection malfunction type on the basis of a density distribution of a scanned image of a vertical line test pattern.

FIG. 4 shows a diagram that explains detection of an ink ejection malfunction position on the basis of a density distribution of a scanned image of a horizontal band test pattern. FIG. 5 shows a diagram that explains determination of an ink ejection malfunction type on the basis of a density distribution of a scanned image of a vertical line test pattern. It should be noted that an arrangement order of vertical lines in the vertical line test pattern is not limited to that shown in FIG. 5.

In this embodiment, because the line sensor 31 is installed to detect a position of a print sheet, for example, the aforementioned test pattern is printed on the print sheet, the circulation transportation unit 10b2 transports the print sheet, the line sensor 31 scans an image of the printed test pattern, and the ink ejection malfunction position is detected on the basis of a primary-scanning-directional density distribution of this image.

For example, as shown in FIG. 4, in the scanned image of the horizontal band test pattern, an appearance position of a dip in the density distribution is detected as the ink ejection malfunction position. In case of slight deviation, a density lack width is narrower than that in case of severe deviation or non-ejection, and therefore a dip density is relatively high. A density measurement value of the appearance position of the dip is compared with a predetermined detection threshold value; and if the density measurement value is less than the detection threshold value, the ink ejection malfunction type of this ink ejection malfunction position is determined as severe deviation or non-ejection, and if the density measurement value is equal to or larger than the detection threshold value, the ink ejection malfunction type of this ink ejection malfunction position is determined as slight deviation or non-ejection.

Further, as shown in FIG. 5, for example, in the scanned image of the vertical line test pattern, detected is a position that a peak disappears in a density distribution of arrangement of the vertical lines; and among the ink ejection malfunction positions, the ink ejection malfunction type of a position that a peak disappears is determined as non-ejection, and the ink ejection malfunction type of a position that a peak does not disappear is determined as slight deviation.

Here, as shown in FIG. 5, for example, the horizontal band test pattern and the vertical line test pattern may be sequentially printed on a single print sheet.

Scanned images of the aforementioned test patterns are obtained using the line sensor 31 or the image scanning device 74. If the line sensor 31 is used for the detection of the ink ejection malfunction positions as mentioned, the ink ejection malfunction positions are automatically detected, and the print sheet on which the test pattern has been printed is outputted. Instead of the line sensor 31, the print sheet on which the test pattern has been printed may be immediately outputted and set on the image scanning device 74 by a user, and the image on the print sheet may be scanned by the image scanning device 74.

The following part explains a behavior of the image forming apparatus 10.

Figure 6:
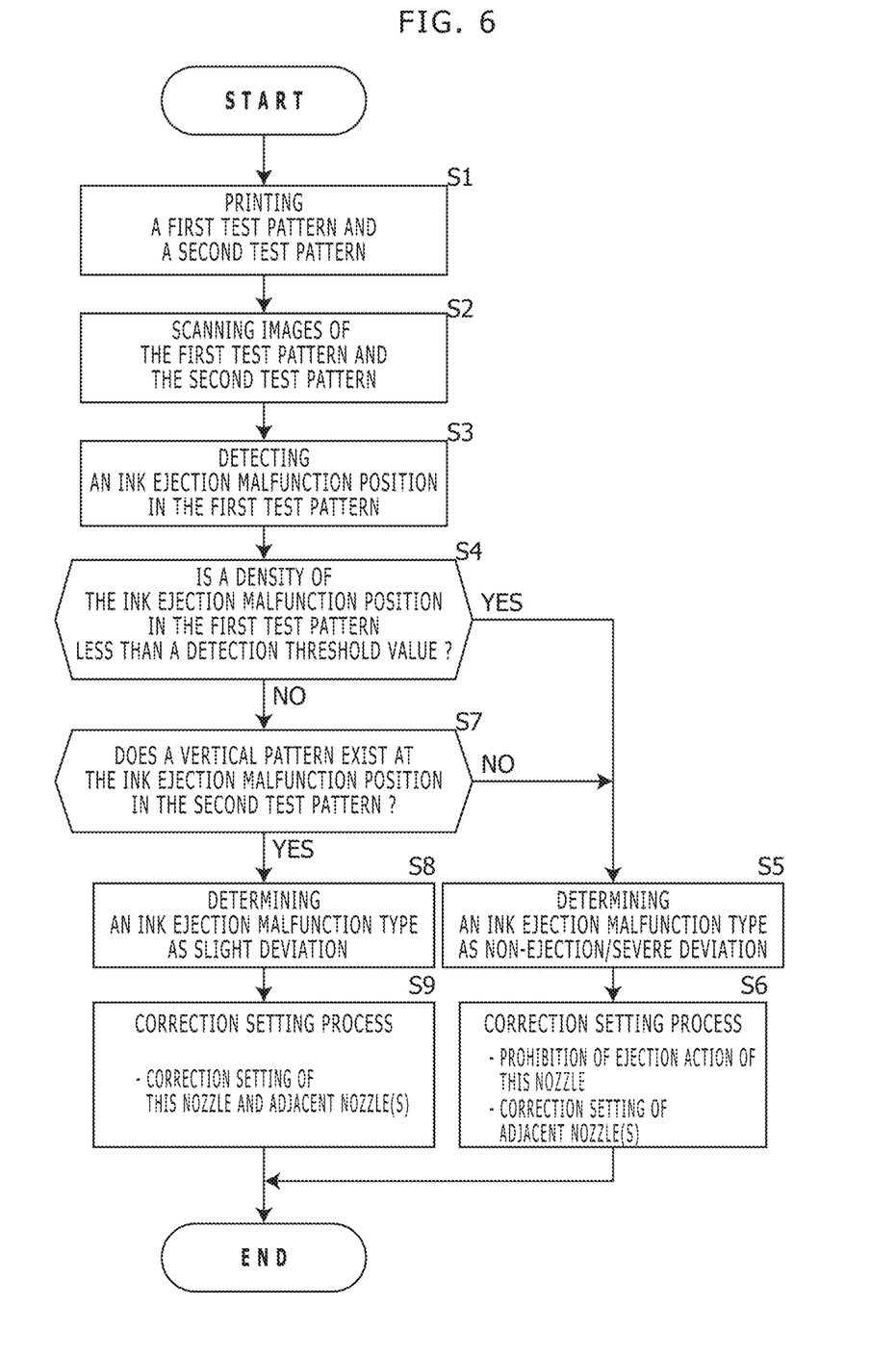
FIG. 6 shows a flowchart that explains a behavior of the image forming apparatus shown in FIGS. 1 to 3.

(a) Detection of an Ink Ejection Malfunction Position and Setting of the Correction Process FIG. 6 shows a flowchart that explains a behavior of the image forming apparatus shown in FIGS. 1 to 3.

The correction processing unit 83 causes the image outputting unit 71 to print the horizontal band test pattern (first test pattern) and the vertical line test pattern (second test pattern) on a print sheet (in Step S1).

The correction processing unit 83 acquires a scanned image (i.e. image data of each ink color) of the horizontal band test pattern and the vertical line test pattern using the line sensor 31 or the image scanning device 74 as mentioned (in Step S2).

The correction processing unit 83 detects an ink ejection malfunction position on the basis of a density distribution of the scanned image of the horizontal band test pattern in the primary scanning direction as mentioned, and determines a nozzle corresponding to the ink ejection malfunction position (in Step S3).

The correction processing unit 83 determines a density of each of the ink ejection malfunction positions in the scanned image of the horizontal band test pattern and determines whether the determined density is less than the detection threshold value or not (in Step S4).

If the determined density is less than the detection threshold value, the correction processing unit 83 determines the ink ejection malfunction type of the ink ejection malfunction position as severe deviation or non-ejection (in Step S5), and performs a correction setting process (in Step S6). Here, the correction setting process sets prohibition of an ejection action of a nozzle corresponding to the ink ejection malfunction position, a pixel value adjustment amount of an adjacent nozzle of the nozzle corresponding to the ink ejection malfunction position and the like, and stores setting data of them into the storage device 73.

Contrarily, if the determined density is equal to or larger than the detection threshold value, the correction processing unit 83 determines whether a vertical pattern (i.e. a density) exists at the ink ejection malfunction position in the scanned image of the vertical line test pattern (in Step S7).

If a vertical pattern does not exist at the ink ejection malfunction position, then the correction processing unit 83 determines the ink ejection malfunction type of the ink ejection malfunction position as non-ejection (in Step S5), and performs a correction setting process (in Step S6). Contrarily, if a vertical pattern exists at the ink ejection malfunction position, then the correction processing unit 83 determines the ink ejection malfunction type of the ink ejection malfunction position as slight deviation (in Step S8), and performs a correction setting process (in Step S9). Here, the correction setting process sets pixel value adjustment amounts of both a nozzle corresponding to the ink ejection malfunction position and an adjacent nozzle of the nozzle corresponding to the ink ejection malfunction position and the like, and stores setting data of them into the storage device 73.

As mentioned, nozzles (ink ejection malfunction positions) are set as targets of the correction process.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 83 reads the aforementioned setting data from the storage device 73 and determines the ink ejection malfunction positions and nozzles of targets of the correction process before starting the printing; and upon detecting a position of a print sheet using the line sensor 31, the correction processing unit 83 (a) determines a nozzle corresponding to each pixel in the aforementioned image, (b) determines the ink ejection malfunction positions in the aforementioned image (i.e. corresponding nozzles), and (c) performs the correction process for the ink ejection malfunction positions. Subsequently, the control unit 81 performs the aforementioned printing on the basis of the image data after the correction process.

As mentioned, in the aforementioned embodiment, the recording head 1a, 1b, 1c or 1d ejects ink corresponding to an image to be printed, using arranged nozzles. The control unit 81 determines nozzles corresponding to the image to be printed, correspondingly to a position of a print sheet, and causes the recording head 1a, 1b, 1c or 1d to eject ink from the nozzles. The correction processing unit 83 performs a correction process corresponding to each of the plural ink ejection malfunction positions in the aforementioned image. Further, the correction processing unit 83 (a) prints a test pattern using the recording heads 1a to 1d, (b) determines the ink ejection malfunction positions on the basis of a scanned image of the test pattern, (c) sets one of first and second correction modes for each of the ink ejection malfunction positions in accordance with a density of the ink ejection malfunction position on the basis of the scanned image of the test pattern, and (d) performs the correction process for each of the ink ejection malfunction positions in the set first or second correction mode. Here, in the first correction mode, the correction process is performed for both a nozzle corresponding to the ink ejection malfunction position and an adjacent nozzle of the nozzle corresponding to the ink ejection malfunction position; and in the second correction mode, the correction process is not performed for a nozzle corresponding to the ink ejection malfunction position but the correction process is performed for an adjacent nozzle of the nozzle corresponding to the ink ejection malfunction position.

Consequently, the correction process is skipped for a nozzle of ink ejection malfunction of severe deviation or non-ejection, and thereby the correction process corresponding to ink ejection malfunction is effectively performed. Thus, since the ink ejection malfunction positions as targets of the correction process are reduced, a time required for the correction process gets short. Therefore, in a short time from determination of a print sheet position to ink ejection, it is possible to determine pixels corresponding to malfunction nozzles in an image to be printed, and perform the correction process for peripheries of the pixels.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
a recording head configured to eject ink corresponding to an image to be printed, using arranged nozzles;
a control unit configured to determine nozzles corresponding to the image to be printed, correspondingly to a position of a print sheet, and cause the recording head to eject ink from the nozzles; and
a correction processing unit configured to perform a correction process corresponding to each of plural ink ejection malfunction positions in the image;
wherein the correction processing unit (a) prints a test pattern using the recording head, (b) determines the ink ejection malfunction positions on the basis of a scanned image of the test pattern, (c) sets one of first and second correction modes for each of the ink ejection malfunction positions in accordance with a density of the ink ejection malfunction position on the basis of the scanned image of the test pattern, and (d) performs the correction process for the ink ejection malfunction position in the set first or second correction mode;
in the first correction mode, the correction process is performed for a nozzle corresponding to the ink ejection malfunction position and an adjacent nozzle of the nozzle corresponding to the ink ejection malfunction position; and
in the second correction mode, the correction process is not performed for a nozzle corresponding to the ink ejection malfunction position but the correction process is performed for an adjacent nozzle of the nozzle corresponding to the ink ejection malfunction position.

2. The image forming apparatus according to claim 1, wherein the test pattern comprises of a band-shaped first test pattern that extends along a primary scanning direction and a second test pattern that includes thin lines individually corresponding to the nozzles,
wherein the correction processing unit sets the first and second correction modes for each of the ink ejection malfunction positions by preliminarily selecting one of the first and second correction modes in accordance with a density of the ink ejection malfunction position in the scanned image of the first test pattern, and if the second correction mode is preliminarily selected on the basis of the scanned image of the first test pattern, selecting one of the first and second correction modes in accordance with whether the second test pattern exists at the ink ejection malfunction position or not, and sets the selected first or second correction mode based on the preliminary selection.

3. The image forming apparatus according to claim 1, wherein for the ink ejection malfunction position on the basis of the scanned image of the test pattern, the correction processing unit (a) determines an ink ejection malfunction type as one of "severe deviation or non-ejection" and "slight deviation", and (b) if the ink ejection malfunction type is determined as slight deviation, sets the first correction mode, and if the ink ejection malfunction type is determined as severe deviation or non-ejection, sets the second correction mode.

4. The image forming apparatus according to claim 1, wherein the correction processing unit performs the correction process as a hardware process.

5. The image forming apparatus according to claim 1, further comprising a line sensor configured to detect a position of the print sheet;
wherein the line sensor generates the scanned image of the test pattern.

6. The image forming apparatus according to claim 1, wherein the test pattern comprises of a band-shaped first test pattern that extends along a primary scanning direction and a second test pattern that includes thin lines individually corresponding to the nozzles, and wherein
wherein the correction processing unit measures a density of the ink ejection malfunction position; and
wherein the correction processing unit sets the second correction mode if the density of the ink ejection malfunction position is less than a predetermined detection threshold value on the basis of the scanned image of the first test pattern; sets the first correction mode if the density of the ink ejection malfunction position is equal to or larger than the detection threshold value and the second test pattern exists at the ink ejection malfunction position and sets the second correction mode if the density of the ink ejection malfunction position is equal to or larger than the detection threshold value and the second test pattern does not exist at the ink ejection malfunction position.

* * * * *